United States Patent
Oumi

(10) Patent No.: US 9,492,897 B2
(45) Date of Patent: Nov. 15, 2016

(54) BLANK AND METHOD OF MANUFACTURING RACK SHAFT USING THE SAME

(71) Applicant: JTEKT CORPORATION, Osaka-shi, Osaka (JP)

(72) Inventor: Hiroyuki Oumi, Yao (JP)

(73) Assignee: JTEKT CORPORATION, Osaka-shi (JP)

( * ) Notice: Subject to any disclaimer, the term of this patent is extended or adjusted under 35 U.S.C. 154(b) by 148 days.

(21) Appl. No.: 14/299,494

(22) Filed: Jun. 9, 2014

(65) Prior Publication Data

US 2015/0000135 A1  Jan. 1, 2015

(30) Foreign Application Priority Data

Jul. 1, 2013 (JP) ................... 2013-138152
Jul. 1, 2013 (JP) ................... 2013-138153

(51) Int. Cl.
| | | |
|---|---|---|
| *B62D 3/12* | (2006.01) | |
| *B23P 15/14* | (2006.01) | |
| *F16H 55/26* | (2006.01) | |
| *B21K 1/76* | (2006.01) | |

(52) U.S. Cl.
CPC ............... *B23P 15/14* (2013.01); *B21K 1/767* (2013.01); *B62D 3/126* (2013.01); *F16H 55/26* (2013.01); *Y10T 29/49474* (2015.01); *Y10T 74/18096* (2015.01)

(58) Field of Classification Search
CPC ......... B23P 15/14; B62D 3/126; B62D 3/12; B21K 1/767; B21K 1/768; F16H 55/26; B22F 5/08; Y10T 74/18096; Y10T 29/49474
See application file for complete search history.

(56) References Cited

U.S. PATENT DOCUMENTS

| | | |
|---|---|---|
| 2008/0184833 A1 | 8/2008 | Dohmann |
| 2008/0202270 A1* | 8/2008 | Yamawaki ............. B21K 1/767 74/422 |

(Continued)

FOREIGN PATENT DOCUMENTS

| | | |
|---|---|---|
| DE | 101 49 989 A1 | 4/2003 |
| JP | A-2013-501621 | 1/2013 |

(Continued)

OTHER PUBLICATIONS

Extended Search Report issued in European Patent Application No. 14172513.5 dated Aug. 19, 2014.

*Primary Examiner* — David Bryant
*Assistant Examiner* — Jun Yoo
(74) *Attorney, Agent, or Firm* — Oliff PLC

(57) ABSTRACT

A blank is provided with a first shaft portion, a second shaft portion, and a machining target portion. The machining target portion is formed at a position closer to a shaft end portion of the first shaft portion than a shaft end portion of the second shaft portion. A first large-volume portion is formed at the first end portion of the machining target portion close to the first shaft portion, and a second large-volume portion is formed at the second end portion of the machining target portion close to the second shaft portion, respectively. The volumes per unit length of the first and second large-volume portions are greater than the volume per unit length of the intermediate portion in the axial direction of the machining target portion. Furthermore, the volume of the second large-volume portion is greater than the overall volume of the first large-volume portion.

4 Claims, 6 Drawing Sheets

(56) References Cited

U.S. PATENT DOCUMENTS

2010/0162843 A1* 7/2010 Kobayashi ............ B21K 1/767
　　　　　　　　　　　　　　　　　　　　　　74/422
2012/0137747 A1　6/2012 Cornish et al.

FOREIGN PATENT DOCUMENTS

| WO | WO 2005/053875 A1 | 6/2005 |
| WO | WO 2006/037167 A1 | 4/2006 |
| WO | WO 2011/017736 A1 | 2/2011 |

* cited by examiner

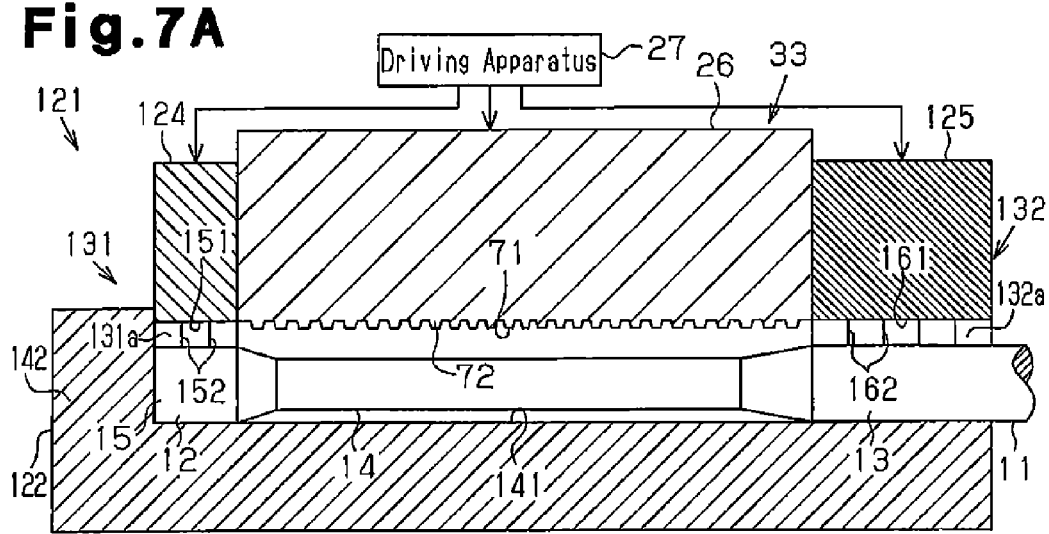
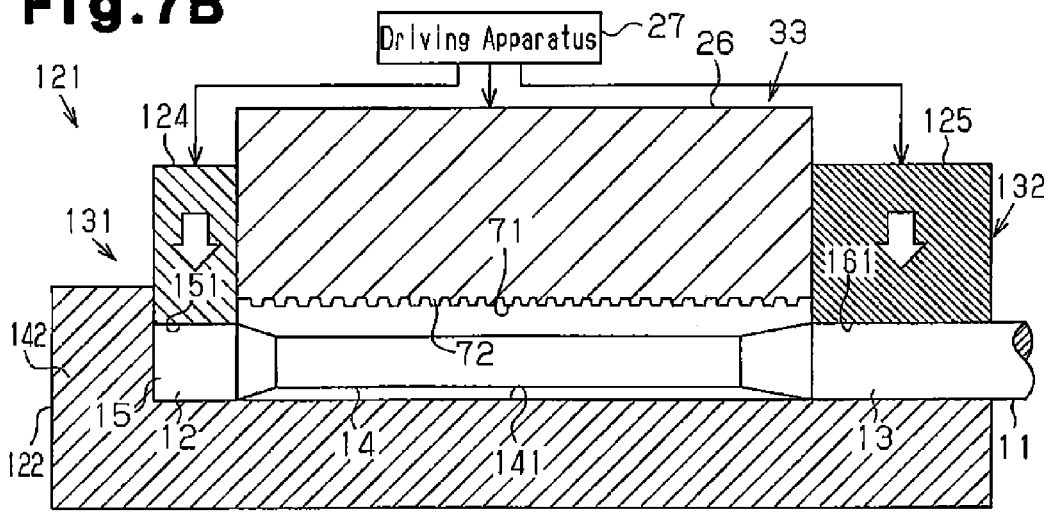
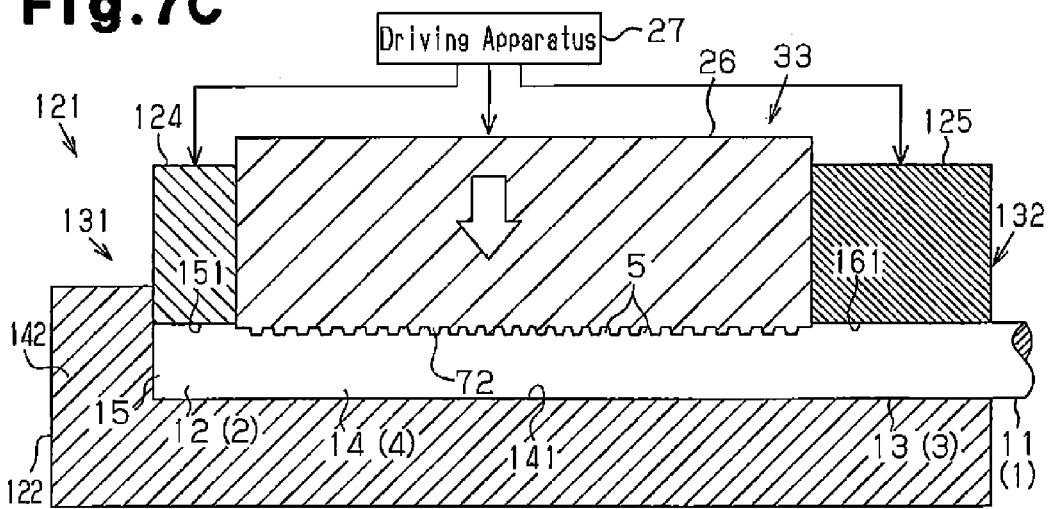

BLANK AND METHOD OF MANUFACTURING RACK SHAFT USING THE SAME

BACKGROUND OF THE INVENTION

The present invention relates to a blank and a method of manufacturing a rack shaft using the same.

Conventionally, an apparatus for manufacturing a rack shaft has a plurality of rack teeth molded into a round rod-shaped blank by forging. The plurality of rack teeth is molded to be aligned in an axial direction of the blank. In recent years, manufacturing apparatuses for performing near net shape forging in which a shape after forging the blank becomes a shape close to a final product have been suggested.

A manufacturing apparatus described in Japanese National Phase Laid-Open Patent Publication No. 2013-501621 includes a first gripping portion, a second gripping portion, and a tooth forging portion. The first gripping portion has a first cylindrical inner circumferential surface coming into contact with a first shaft portion of the blank. The second gripping portion has a second cylindrical inner circumferential surface coming into contact with a second shaft portion of the blank. The teeth forging portion is formed to define a space having substantially the same shape as a final shape of the teeth portion of the rack shaft formed with the rack teeth. In this manufacturing apparatus, the first shaft portion is gripped by the first gripping portion, and the second shaft portion is gripped by the second gripping portion. In this state, a machining target portion of the blank provided between the first shaft portion and the second shaft portion is located in a space of the teeth forging portion. Moreover, the blank is plastically deformed by the teeth forging portion, and thus, the rack teeth are molded.

When the blank is plastically deformed by forging as described above, the material of the blank flows. Specifically, as illustrated in FIG. 9, first, teeth 92 of the teeth forging portion are pressed against a machining target portion 91 of the blank. Then, in the machining target portion 91, a site coming into contact with each of machining teeth 93 is depressed. Thus, as illustrated by two-dot chain line in FIG. 9, the material of the machining target portion 91 swells to enter a space S between the adjacent machining teeth 93. In this way, the shape of the teeth 92 is transferred into the machining target portion 91 to mold the rack teeth. A thick line in FIG. 9 schematically illustrates the flow of the material.

Thus, at the first end portion of the machining target portion 91 close to the first shaft portion, when pressed by the machining teeth 93, the material that does not enter the space S may flow into the first shaft portion. Similarly, also at the second end portion of the machining target portion 91 close to the second shaft portion, when pressed by the machining teeth 93, the material that does not enter the space S may flow into the second shaft portion. For that reason, at both end portions of the machining target portion 91 close to the first and second shaft portions, the material easily decreases as compared to an intermediate portion in the axial direction of the machining target portion 91. That is, when forging the machining target portion 91, at both end portions of the machining target portion 91 close to the first and second shaft portions, a filling rate of the material within the space of the teeth forging portion easily decreases. As a result, at both end portions of the machining target portion 91 close to the first and second shaft portions, the material may not reach the bottom surface of the teeth 92. For that reason, there is a possibility that the rack shaft may be molded in a state in which a part of the rack teeth are lacked.

SUMMARY OF THE INVENTION

An object of the invention is to provide a blank in which a shape accuracy of the rack teeth is improved, and a method of manufacturing the rack shaft using the same.

In order to solve the above-described problems, according to a first aspect of the invention, there is provided a blank that is equipped with a first shaft portion, a second shaft portion, and a machining target portion provided between the first shaft portion and the second shaft portion, wherein a plurality of rack teeth aligned in an axial direction are formed on the machining target portion. A volume per unit length of at least one of a first end portion of the machining target portion close to the first shaft portion and a second end portion of the machining target portion close to the second shaft portion is greater than a volume per unit length of an intermediate portion in the axial direction of the machining target portion.

In order to solve the above-described problems, according to a second aspect of the invention, there is provided a method of manufacturing the rack shaft. This method uses a blank which is equipped with a first shaft portion, a second shaft portion, and a machining target portion provided between the first shaft portion and the second shaft portion, wherein a volume per unit length of at least one of a first end portion of the machining target portion close to the first shaft portion and a second end portion of the machining target portion close to the second shaft portion is greater than a volume per unit length of an intermediate portion in the axial direction of the machining target portion. Furthermore, by forging the machining target portion in a state of gripping the first and second shaft portions, a plurality of rack teeth aligned in the axial direction are molded on the machining target portion.

BRIEF DESCRIPTION OF THE DRAWINGS

FIGS. 7A to 7C are cross-sectional views illustrating each of processes when molding the rack teeth on the blank;

DETAILED DESCRIPTION OF THE PREFERRED EMBODIMENTS (First Embodiment)

Hereinafter, a first embodiment of a blank of the invention and a method of manufacturing a rack shaft using the same will be described with reference to FIGS. 1A to 5C. The rack shaft is assembled to a pinion shaft (not illustrated) which rotates by a steering operation. The rack shaft constitutes a rack-and-pinion mechanism together with a pinion shaft.

Figure 1A:
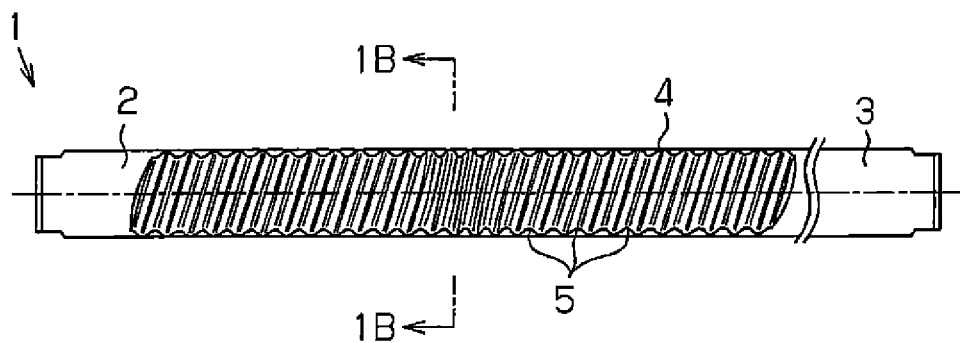
FIG. 1A is a plan view of a rack shaft manufactured from a blank of the invention.

As illustrated in FIG. 1A, the rack shaft 1 has a first shaft portion 2, a second shaft portion 3, and a teeth portion 4. The first and second shaft portions 2 and 3 are formed in a round rod shape. An overall length of the first shaft portion 2 is shorter than an overall length of the second shaft portion 3. The teeth portion 4 is formed between the first shaft portion 2 and the second shaft portion 3. In the teeth portion 4, a plurality of rack teeth 5 are aligned in the axial direction of the rack shaft 1. Each of the rack teeth 5 is formed to continuously change a pressure angle and the like, depending on an axial position. The rack shaft 1 is adopted for a variable gear ratio steering gear. In the variable gear ratio steering gear, a ratio of a turning angle change of a turning wheel to a steering angle change of a steering wheel changes in accordance with the steering angle.

Figure 1B:
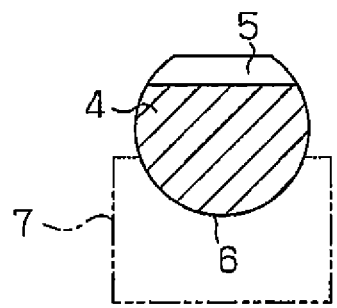
FIG. 1B is a cross-sectional view taken along a line 1B-1B of FIG. 1A.

As illustrated in FIG. 1B, the teeth portion 4 has a rear surface 6 on the opposite side to the rack teeth 5. The rear surface 6 is formed to have a semicircular arc cross-section. The rear surface 6 has a constant shape over the overall length of the teeth portion 4. That is, the rear surface 6 has no irregularities over the overall length of the teeth portion 4. The rack shaft 1 is supported by a rack guide 7 from the rear surface 6 as indicated by two-dot chain line in FIG. 1B, in the state of being assembled to the pinion shaft.

Next, manufacturing of the rack shaft 1 will be described with reference to FIG. 2.

Figure 2:
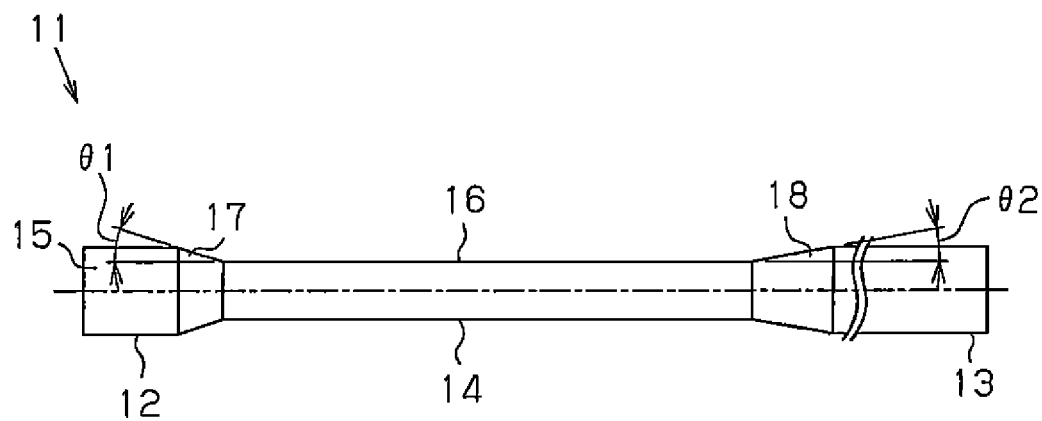
FIG. 2 is a plan view of the blank.

As illustrated in FIG. 2, the rack shaft 1 is manufactured by forging the round rod-shaped blank 11 to mold the rack teeth 5 thereto. The blank 11 has a first shaft portion 12, a second shaft portion 13, and a machining target portion 14. The first and second shaft portions 12 and 13 are formed in a round rod shape. The cross-sectional shape of the first and second shaft portions 12 and 13 is a circle having a constant outer diameter over the overall length of each of the shaft portions. An outer diameter of the first shaft portion 12 is substantially equal to an outer diameter of the second shaft portion 13. The overall length of the first shaft portion 12 is shorter than the overall length of the second shaft portion 13.

The machining target portion 14 is formed between the first shaft portion 12 and the second shaft portion 13. The machining target portion 14 is located at a position closer to the shaft end portion 15 of the first shaft portion 12 than the shaft end portion of the second shaft portion 13. The machining target portion 14 is formed in a round rod shape that is thinner than the first and second shaft portions 12 and 13. Both end portions of the machining target portion 14 are formed to be thicker than an intermediate portion in the axial direction of the machining target portion 14. In other words, the intermediate portion 16 in the axial direction of the machining target portion 14 is thinner than the first and second shaft portions 12 and 13. The cross-sectional shape of the intermediate portion 16 is a circle having a constant outer diameter over the overall length of the intermediate portion 16.

At the first end portion of the machining target portion 14 close to the first shaft portion 12, a first large-volume portion 17 forming a circular cross-sectional shape is formed. An outer diameter of the first large-volume portion 17 gradually increases toward the first shaft portion 12 from the intermediate portion 16. For this reason, the volume per unit length of the first large-volume portion 17 is greater than the volume per unit length of the intermediate portion 16. In other words, an area of the cross section perpendicular to the axis of the first large-volume portion 17 is greater than a cross-sectional area of the intermediate portion 16. Furthermore, an outer circumferential surface of the first large-volume portion 17 inclines with respect to the axis of the blank 11 by a first predetermined angle θ1 (for example, about 20°).

At the second end portion of the machining target portion 14 close to the second shaft portion 13, a second large-volume portion 18 forming a circular cross-sectional shape is also formed. An outer diameter of the second large-volume portion 18 gradually increases toward the second shaft portion 13 from the intermediate portion 16. For this reason, the volume per unit length of the second large-volume portion 18 is greater than the volume per unit length of the intermediate portion 16. In other words, an area of the cross section perpendicular to the axis of the second large-volume portion 18 is greater than the cross-sectional area of the intermediate portion 16. Furthermore, the outer circumferential surface of the second large-volume portion 18 inclines with respect to the axis of the blank 11 by a second predetermined angle θ2 (for example, about 15°) smaller than the first predetermined angle θ1. Thus, the second large-volume portion 18 is longer than the first large-volume portion 17. Furthermore, the overall volume of the second large-volume portion 18 is greater than the overall volume of the first large-volume portion 17. Furthermore, the blank 11 is made up of a round rod having a constant outer diameter over the overall length. The blank 11 is manufactured by molding the machining target portion 14 from the round rod by forging, cutting or the like.

Next, a manufacturing apparatus of the rack shaft will be described with reference to FIG. 3.

Figure 3:
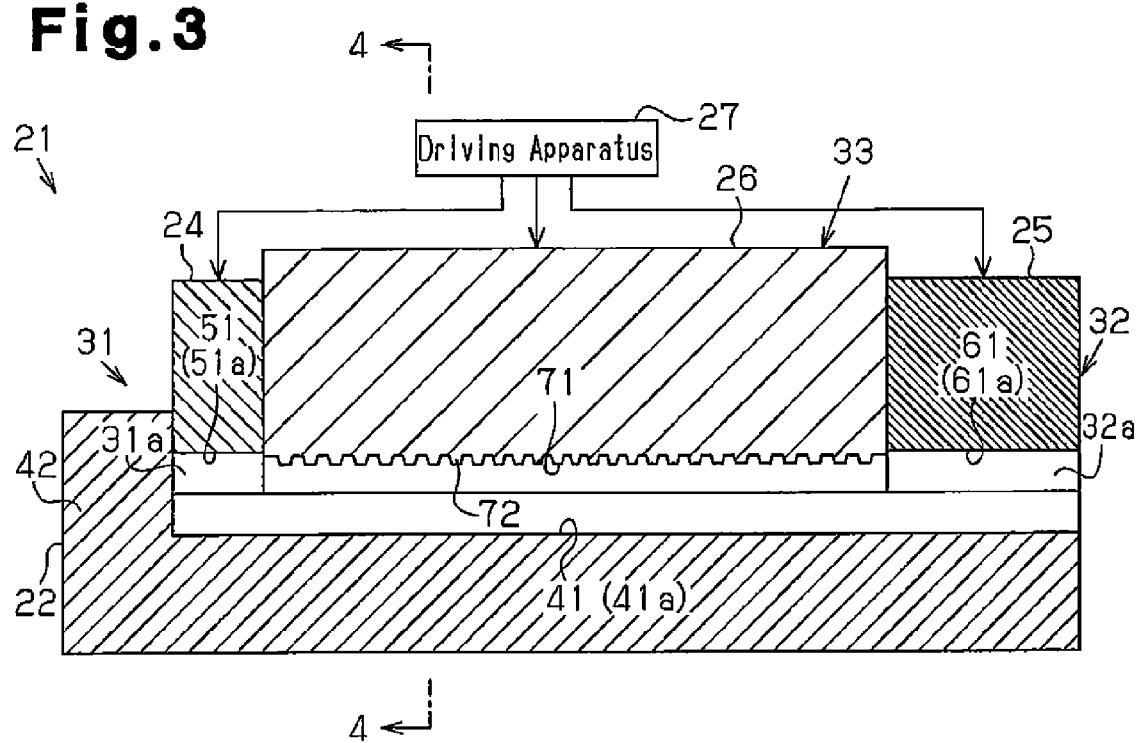
FIG. 3 is a cross-sectional view illustrating a schematic configuration of a manufacturing apparatus of the rack shaft according to a first embodiment of the invention.

As illustrated in FIG. 3, the manufacturing apparatus 21 is equipped with a die 22, a first punch die 24, a second punch die 25, and a punch 26. The punch 26 is located between the first punch die 24 and the second punch die 25. The first punch die 24, the second punch die 25, and the punch 26 vertically move independently of each other by a driving apparatus 27 using hydraulic pressure or the like. As a result, the first punch die 24, the second punch die 25, and the punch 26 are close to or spaced from the die 22.

A first gripping portion 31 is formed by the die 22 and the first punch die 24. The first gripping portion 31 has a cylindrical first inner circumferential surface 31a coming into contact with the first shaft portion 12 of the blank 11. A second gripping portion 32 is formed by the die 22 and the second punch die 25. The second gripping portion 32 has a cylindrical second inner circumferential surface 32a coming into contact with the second shaft portion 13. A teeth forging portion 33 is formed by the die 22 and the punch 26. The teeth forging portion 33 is a portion that forges the machining target portion 14 in order to mold the rack teeth 5.

The die 22 is formed in a rectangular shape. A lower gripping groove 41 is formed on an upper surface of the die 22 facing the first punch die 24, the second punch die 25, and the punch 26. A part of the first shaft portion 12, the second shaft portion 13, and the machining target portion 14 of the blank 11 is housed in the lower gripping groove 41. The lower gripping groove 41 extends in a straight line shape. The lower gripping groove 41 extends substantially parallel to the side edges of the die 22. A first axial end of the lower gripping groove 41, that is, a left end illustrated in FIG. 3 is not opened at the end surface of the die 22. That is, the first end of the lower gripping groove 41 is blocked. A blocking portion 42 is formed in the die 22 to block the first end of the lower gripping groove 41.

Figure 5A:
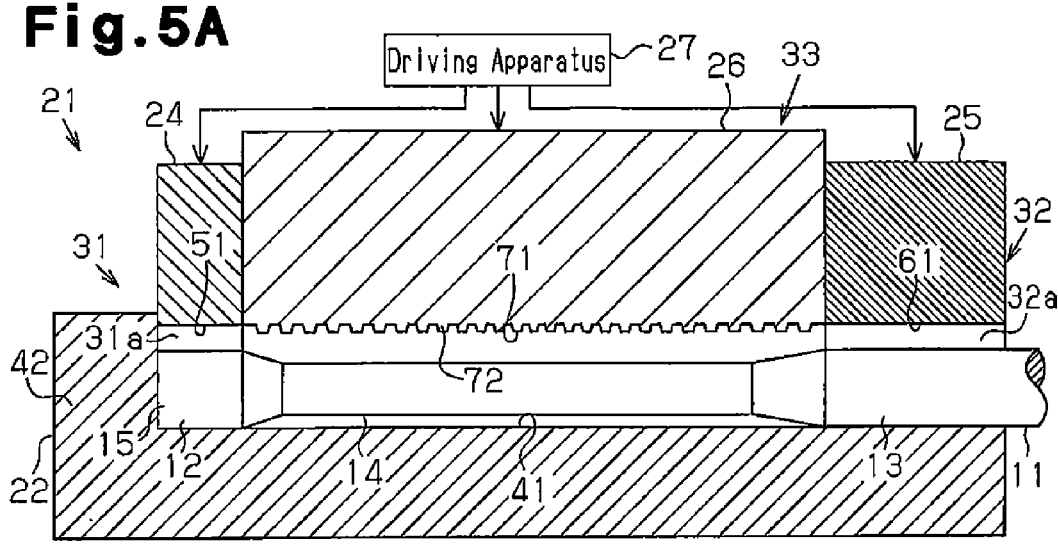
FIGS. 5A to 5C are cross-sectional views illustrating each of processes when molding the rack teeth on the blank.
Figure 5B:
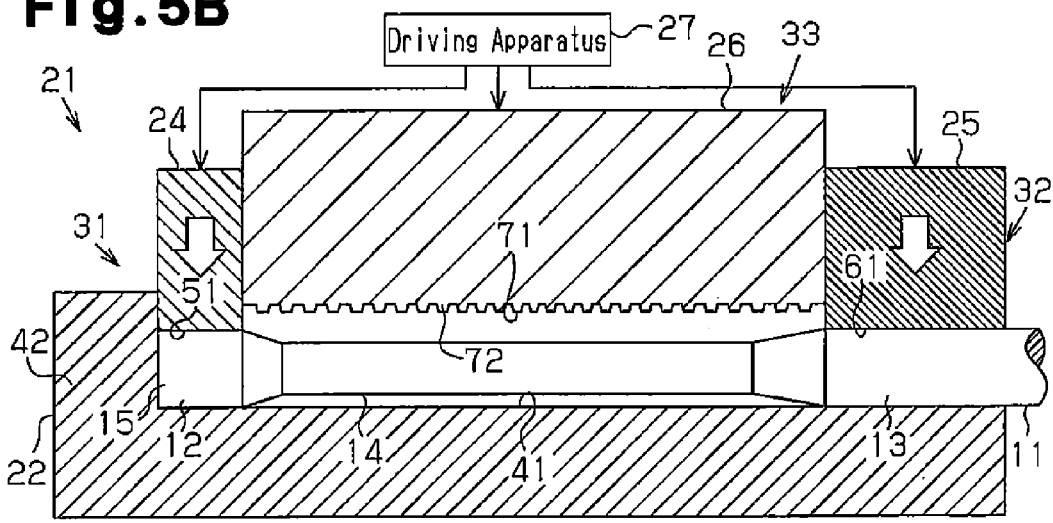
Figure 5C:
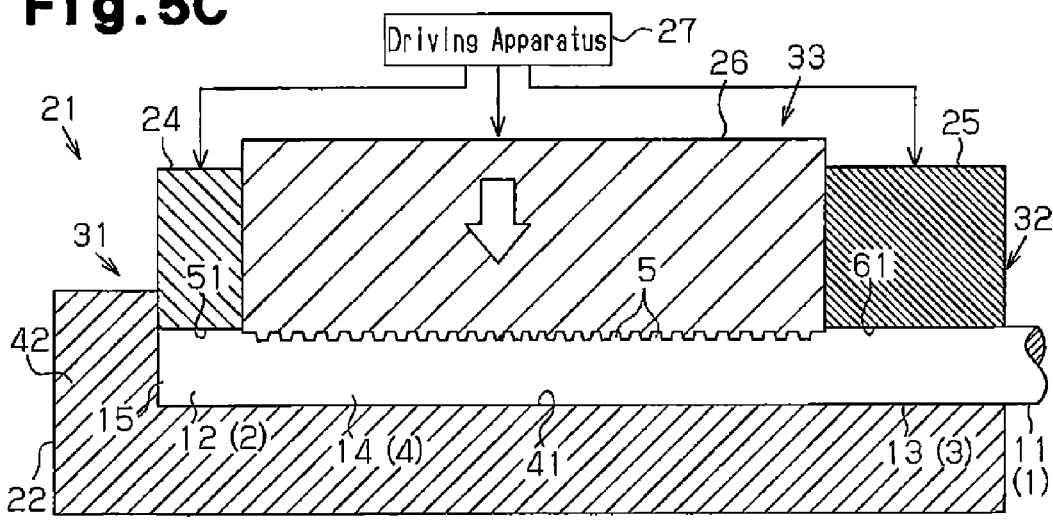

Meanwhile, a second axial end of the lower gripping groove 41, that is, a right end of FIG. 3 is opened at the end surface of the die 22. As illustrated in FIGS. 5A to 5C, the overall length of the lower gripping groove 41 is set to be able to house the second shaft portion 13 over a range longer than the overall length of the first shaft portion 12 in a state of bringing the shaft end portion 15 of the blank 11 into contact with the blocking portion 42. The cross-section of the lower gripping groove 41 is formed in a semicircular shape over the overall length of the lower gripping groove 41. The inner diameter of the lower gripping groove 41 is substantially equal to the outer diameters of the first and second shaft portions 12 and 13.

The first punch die 24 is formed in a rectangular shape. At the lower surface facing the die 22 of the first punch die 24, a first upper gripping groove 51 having a semicircular cross section is formed. The first shaft portion 12 of the blank 11 is housed in the first upper gripping groove 51. The first upper gripping groove 51 is formed in a linear shape and extends substantially parallel to the lower gripping groove 41. The overall length of the first upper gripping groove 51 is substantially equal to the overall length of the first shaft portion 12 of the blank 11. Each axial end portion of the first upper gripping groove 51 is opened at the end surface corresponding to the first punch die 24.

The inner diameter of the first upper gripping groove 51 is substantially equal to the outer diameter of the first shaft portion 12 over the overall length of the first upper gripping groove 51. When the first punch die 24 comes close to the die 22, the first shaft portion 12 of the blank 11 is gripped between the first upper gripping groove 51 and the lower gripping groove 41. Thus, the first gripping portion 31 is formed by the die 22 and the first punch die 24. Furthermore, a first inner circumferential surface 31a coming into contact with the outer circumferential surface of the first shaft portion 12 is formed by an inner wall surface 41a of the lower gripping groove 41 and an inner wall surface 51a of the first upper gripping groove 51.

The second punch die 25 is formed in a rectangular shape. On a lower surface of the second punch die 25 facing the die 22, a second upper gripping groove 61 having a semicircular cross-section is formed. A part of the second shaft portion 13 of the blank 11 is housed in the second upper gripping groove 61. The second upper gripping groove 61 is formed in a linear shape and extends substantially parallel to the lower gripping groove 41. The overall length of the second upper gripping groove 61 is longer than the overall length of the first upper gripping groove 51. Each axial end portion of the second upper gripping groove 61 is opened at the end surface corresponding to the second punch die 25.

The inner diameter of the second upper gripping groove 61 is substantially equal to the outer diameter of the second shaft portion 13 over the overall length of the second upper gripping groove 61. When the second punch die 25 comes close to the die 22, the second shaft portion 13 of the blank 11 is gripped between the second upper gripping groove 61 and the lower gripping groove 41. Thus, the second gripping portion 32 is formed by the die 22 and the second punch die 25. Furthermore, a second inner circumferential surface 32a coming into contact with the outer circumferential surface of the second shaft portion 13 is formed by the inner wall surface 41a of the lower gripping groove 41 and the inner wall surface 61a of the second upper gripping groove 61.

Figure 4:
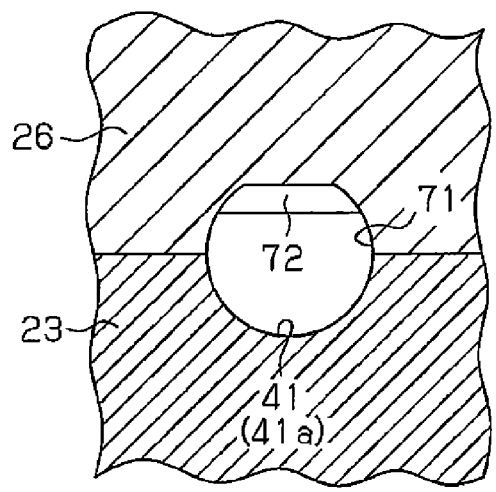
FIG. 4 is a cross-sectional view taken along a line 4-4 of FIG. 3.

The punch 26 is formed in a rectangular shape. A teeth-shaped groove 71 is formed on the lower surface of the punch 26 facing the die 22. The teeth-shaped groove 71 is formed coaxially with the first and second upper gripping grooves 51 and 61. The overall length of the teeth-shaped groove 71 is substantially equal to the overall length of the machining target portion 14 of the blank 11. Each of the axial end portions of the teeth-shaped groove 71 is opened at the corresponding end surface of the punch 26. A plurality of teeth 72 are formed on the teeth-shaped groove 71. The plurality of teeth 72 are formed by inverting the plurality of rack teeth 5 of the rack shaft 1. As illustrated in FIGS. 1B, 3 and 4, the teeth-shaped groove 71 defines a space having substantially the same shape as the teeth portion 4 of the rack shaft 1 when bringing the punch 26 into contact with the die 22. Thus, a teeth forging portion 33 is formed by the die 22 and the punch 26.

Next, a method of manufacturing a rack shaft according to the first embodiment will be described with reference to FIGS. 5A to 5C.

As illustrated in FIG. 5A, in order to mold the rack teeth 5 on the machining target portion 14 of the blank 11, first, the blank 11 is located within the lower gripping groove 41 of the die 22.

Next, as illustrated in FIG. 5B, the first and second punch dies 24 and 25 are brought close to the die 22 by the driving apparatus 27. In this way, the first shaft portion 12 of the blank 11 is located between the first upper gripping groove 51 and the lower gripping groove 41, and the second shaft portion 13 of the blank 11 is located between the second upper gripping groove 61 and the lower gripping groove 41. Thus, the first shaft portion 12 is gripped by the first gripping portion 31, and the second shaft portion 13 is gripped by the second gripping portion 32.

Moreover, as illustrated in FIG. 5C, the punch 26 is brought close to the die 22 by the driving apparatus 27 from the state illustrated in FIG. 5B. In this way, the machining target portion 14 of the blank 11 is forged by the teeth forging portion 33. Specifically, the teeth forging portion 33 plastically deforms the machining target portion 14 to fill the blocked space of substantially the same shape as the teeth portion 4 of the rack shaft 1. As a result, the plurality of rack teeth 5 is formed on the machining target portion 14 of the blank 11.

At this time, a part of the material of the machining target portion 14 flows into each of the first and second shaft portions 12 and 13. According to the blank 11 of the first embodiment, as described above, the machining target portion 14 is formed at a position closer to the shaft end portion 15 of the first shaft portion 12 than the shaft end portion of the second shaft portion 13. For this reason, the material of the machining target portion 14 easily flows into the second shaft portion 13.

In this regard, in the first embodiment, the volumes per unit length of the first and second large-volume portions 17 and 18 of the machining target portion 14 are greater than the volume per unit length of the intermediate portion 16. Furthermore, the volume of the second large-volume portion 18 is greater than the volume of the first large-volume portion 17. For this reason, when forging the machining target portion 14, even if the material of the first large-volume portion 17 flows into the first shaft portion 12 and more material of the second large-volume portion 18 flows into the second shaft portion 13, since the volume of the second large-volume portion 18 is greater than the volume of the first large-volume portion 17, the material shortage in the first and second large-volume portions 17 and 18 is suppressed.

Therefore, according to the first embodiment, it is possible to obtain the following effects.

(1) The volumes per unit length of the first and second large-volume portions 17 and 18 are greater than the volume per unit length of the intermediate portion 16. For this reason, when forging the machining target portion 14, the material shortage in the first and second large-volume portions 17 and 18 is suppressed. That is, in the first and second large-volume portions 17 and 18, a filling rate of the material in the space of the teeth forging portion 33 is not lowered. Therefore, in the first and second large-volume portions 17 and 18, it is possible to bring the material to the bottom surface of the teeth 72. Therefore, the shape accuracy of the rack teeth 5 is improved.

(2) The machining target portion 14 of the blank 11 is formed at a position closer to the shaft end portion 15 of the first shaft portion 12 than the shaft end portion of the second shaft portion 13. In this type of the blank 11, the overall length of the second shaft portion 13 is longer than the overall length of the first shaft portion 12, and the overall volume of the second shaft portion 13 is greater than the overall volume of the first shaft portion 12. For this reason, when forging the machining target portion 14, at the second end portion of the machining target portion 14 close to the second shaft portion 13, since the material easily flows into the second shaft portion 13, the material is likely to become insufficient. In this respect, according to the first embodiment, the second large-volume portion 18 is greater than the volume of the first large-volume portion 17. For this reason, even in the blank 11 in which the machining target portion 14 is formed at a position close to the first shaft portion 12, the material shortage in the second large-volume portion 18 is suppressed.

(3) The first and second large-volume portions 17 and 18 are formed in a tapered shape, respectively. For this reason, it is possible to easily manufacture the blank 11 in which the volume per unit length of each end portion of the machining target portion 14 close to the first and second shaft portions 12 and 13 is greater than that of the vicinity of the center of the machining target portion 14.

(Second Embodiment)

Hereinafter, a second embodiment of the invention will be described with reference to FIGS. 6 to 7C. In addition, the detailed description of the portions in the second embodiment similar to those of the first embodiment will not be provided.

Figure 6:
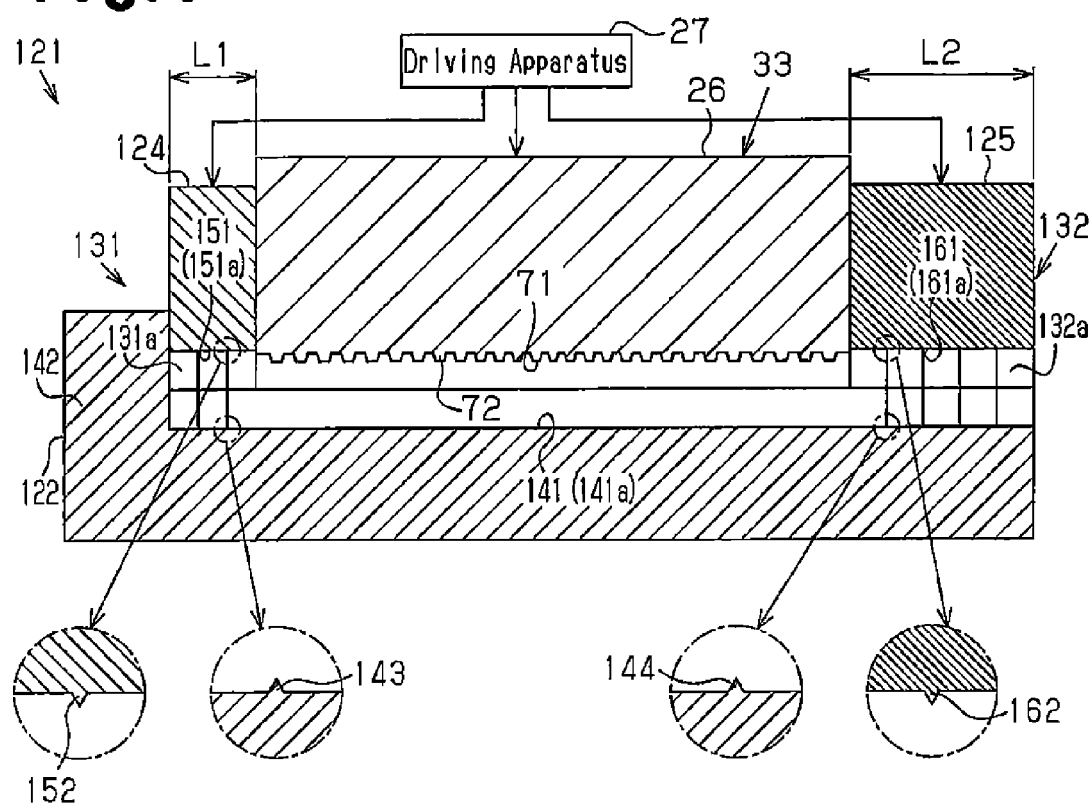
FIG. 6 is a cross-sectional view illustrating a schematic configuration of the manufacturing apparatus of the rack shaft according to a second embodiment of the invention.

As illustrated in FIG. 6, on the inner wall surface 141a of the lower gripping groove 141, a plurality of ridges 143 as a friction increasing structure are formed. The ridges 143 are formed in a range in which the first shaft portion 12 of the blank 11 is located, that is, a range facing the first punch die 124. Furthermore, on the inner wall surface 141a of the lower gripping groove 141, a plurality of ridges 144 as a friction increasing structure are formed. The ridges 144 are formed in a range in which the second shaft portion 13 of the blank 11 is located, that is, a range facing the second punch die 125.

The ridges 143 and 144 project radially inward from the wall surface of the lower gripping groove 141, respectively. Moreover, the ridges 143 and 144 are formed in a semicircular arc shape and each extends along a circumferential direction of the lower gripping groove 141. A range in which the machining target portion 14 of the blank 11 is located on the inner wall surface 141a of the lower gripping groove 141 is an opposing surface of the punch 26 facing the teeth 72. A portion of the inner wall surface 141a facing the teeth 72 has no irregularities over the overall length of the portion.

A plurality of ridges 152 as a friction increasing structure are also formed on the inner wall surface 151a of the first upper gripping groove 151. The ridges 152 protrude radially inward from the wall surface of the first upper gripping groove 151. Furthermore, the ridges 152 are formed in a semicircular arc shape and extend in the circumferential direction of the first upper gripping groove 151. Each of the plurality of the ridges 152 is formed at a position facing the corresponding ridges 143. For this reason, annular ridges coming into contact with the entire circumference of the first shaft portion 12 of the blank 11 are formed by the ridges 143 and 152.

On the inner wall surface 161a of the second upper gripping groove 161, a plurality of ridges 162 as a friction increasing structure are formed. The ridges 162 protrude radially inward from the wall surface of the second upper gripping groove 161. Furthermore, the ridges 162 are formed in a semicircular arc shape and extend in the circumferential direction of the second upper gripping groove 161. Each of the plurality of the ridges 162 is formed at a position facing the corresponding ridges 144. For this reason, annular ridges coming into contact with the entire circumference of the second shaft portion 13 of the blank 11 are formed by the ridges 162 and the ridges 144.

In addition, the overall length of the second upper gripping groove 161 is longer than the overall length of the first upper gripping groove 151. For this reason, an axial length L2 of the second inner circumferential surface 132a is greater than an axial length L1 of the first inner circumferential surface 131a.

Next, a method of manufacturing the rack shaft according to a second embodiment will be described with reference to FIGS. 7A to 7C.

As illustrated in FIG. 7A, in order to mold the rack teeth 5 on the machining target portion 14 of the blank 11, first, the blank 11 is located within the lower gripping groove 141 of the die 122.

Next, as illustrated in FIG. 7B, the first and second punch dies 124 and 125 are brought close to the die 122 by the driving apparatus 27. In this way, the first shaft portion 12 of the blank 11 is located between the first upper gripping groove 151 and the lower gripping groove 141, and the second shaft portion 13 of the blank 11 is located between the second upper gripping groove 161 and the lower gripping groove 141. Thus, the first shaft portion 12 is gripped by the first gripping portion 131, and the second shaft portion 13 is gripped by the second gripping portion 132.

As described above, in the second embodiment, the ridges 143 and 152 are formed on the first inner circumferential surface 131a of the first gripping portion 131 coming into contact with the first shaft portion 12. For this reason, the material of the first shaft portion 12 is caught by the ridges 143 and 152. That is, since the frictional resistance during flow of the material of the first shaft portion 12 is increased by the ridges 143 and 152, the flow of the material is limited. As a result, when forging the machining target portion 14, the flow of the material into the first shaft portion 12 from the machining target portion 14 is limited. Thus, the material shortage at the first end portion of the machining target portion 14 close to the first shaft portion 12 is suppressed.

Similarly, ridges 144 and 162 are formed on the second inner circumferential surface 132a of the second gripping portion 132 coming into contact with the second shaft portion 13. For this reason, the material of the second shaft portion 13 is caught by the ridges 144 and 162. That is, since the frictional resistance during flow of the material of the second shaft portion 13 is increased by the ridges 144 and 162, the flow of the material is limited. Furthermore, since the axial length L2 of the second gripping portion 132 is longer than the axial length L1 of the first gripping portion 131, restraining force is applied over a wide range of the second shaft portion 13 from the second gripping portion 132. That is, when forging the machining target portion 14, a region having a high internal pressure occurs over a wide range of the second shaft portion 13. As a result, the flow of the material into the second shaft portion 13 from the machining target portion 14 is limited. Thus, the material shortage at the second end portion of the machining target portion 14 close to the second shaft portion 13 is suppressed.

Therefore, according to the second embodiment, it is possible to obtain the following effects.

(4) The ridges 143 and 152 are formed on the first inner circumferential surface 131a of the first gripping portion 131. Furthermore, the ridges 144 and 162 are formed on the second inner circumferential surface 132a of the second gripping portion 132. By such a friction increasing structure, the flow of the material into each of the first and second shaft portions 12 and 13 from the machining target portion 14 is limited. Thus, the material shortage at both end portions of the machining target portion 14 close to the first and second shaft portions 12 and 13 is suppressed. That is, when forging the machining target portion 14, at both end portions of the machining target portion 14 close to the first and second shaft portions 12 and 13, a decrease in the filling rate of the material within the space of the teeth forging portion 33 is suppressed. As a result, at both end portions of the machining target portion 14 close to the first and second shaft portions 12 and 13, it is possible to easily bring the material close to the bottom surface of the teeth 72. Therefore, the shape accuracy of the rack teeth 5 is improved.

(5) The machining target portion 14 of the blank 11 is formed at a position closer to the shaft end portion 15 of the first shaft portion 12 than the shaft end portion of the second shaft portion 13. In this type of the blank 11, the overall length of the second shaft portion 13 is longer than the overall length of the first shaft portion 12, and the overall volume of the second shaft portion 13 is greater than the overall volume of the first shaft portion 12. For this reason, when forging the machining target portion 14, at the second end portion of the machining target portion 14 close to the second shaft portion 13, since the material easily flows into the second shaft portion 13, the material is likely to become insufficient. In this respect, according to the second embodiment, the axial length L2 of the second gripping portion 132 is longer than the axial length L1 of the first gripping portion 131. In this case, since a region having a high internal pressure occurs over a wide range of the second shaft portion 13, the flow of the material into the second shaft portion 13 from the machining target portion 14 is limited. Thus, the material shortage at the second end portion of the machining target portion 14 close to the second shaft portion 13 is suppressed.

(6) A portion facing the teeth 72 on the inner wall surface 141a of the lower gripping groove 141 has no irregularities over the overall length of the portion. For this reason, when molding the rack teeth 5 on the machining target portion 14, the rear surface 6 of the machining target portion 14 located on the opposite side to the rack teeth 5 is finished to a smooth surface shape having no irregularities. For that reason, even if machining is hardly performed after forging the machining target portion 14, it is possible to finish the rack shaft 1 to a final shape. In this way, it is possible to mold the rack shaft 1 supported to be movable back and forth with respect to the rack guide 7.

(7) Any of the ridges 143, 144, 152, and 162 has a shape that simply extends in the circumferential direction of the lower gripping groove 141, the first upper gripping groove 151, and the second upper gripping groove 161. It is possible to increase the frictional resistance when the materials of the first and second shaft portions 12 and 13 flow only by adding such a simple shape.

In addition, the first and second embodiments may be modified as follows.

In the first embodiment, the cross-sectional shape of the machining target portion 14 may be changed to an elliptical shape or a shape in which two parallel surfaces are formed by cutting a part of a circle.

The first and second large-volume portions 17 and 18 may be formed so that a slope angle formed by the outer circumferential surface of each large-volume portion and the axis of the blank 11 continuously changes along the axis. Furthermore, the first and second large-volume portions 17 and 18 may be formed so that the outer diameter of each of the large-volume portion becomes thicker stepwise toward the corresponding shaft portions.

The machining target portion 14 may be formed so that the volume of the second large-volume portion 18 is equal to the volume of the first large-volume portion 17 or smaller than the volume of the first large-volume portion 17.

The machining target portion 14 may be formed so that only one volume per unit length of both end portions of the machining target portion 14 close to the first and second shaft portions 12 and 13 is greater than that of the intermediate portion 16.

In the second embodiment, the ridges 143, 144, 152, and 162 formed on the first and second inner circumferential surfaces 131a and 132a were used as the friction increasing structure, but as long as the structure increases the frictional resistance when the material of the blank 11 flows, the structure may be appropriately changed.

Figure 8:
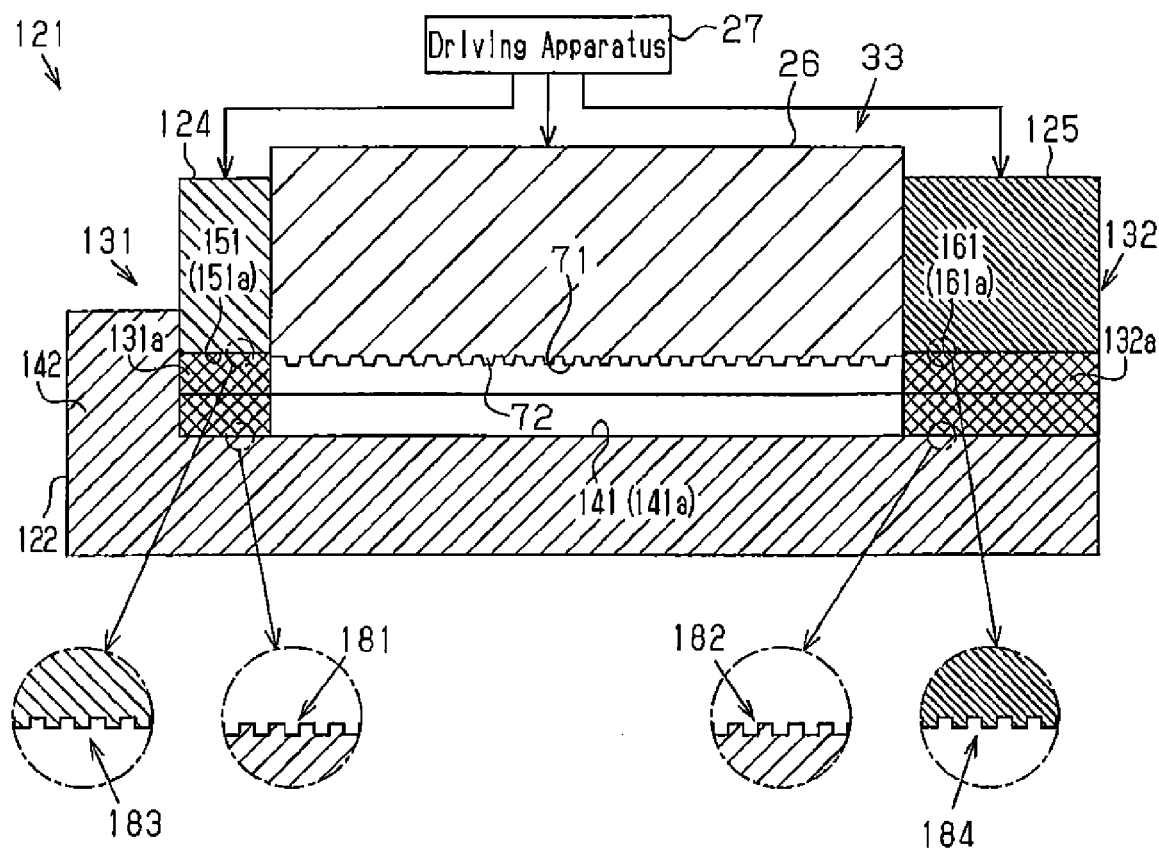
FIG. 8 is a cross-sectional view illustrating a schematic configuration of a manufacturing apparatus of another example.
Figure 9:
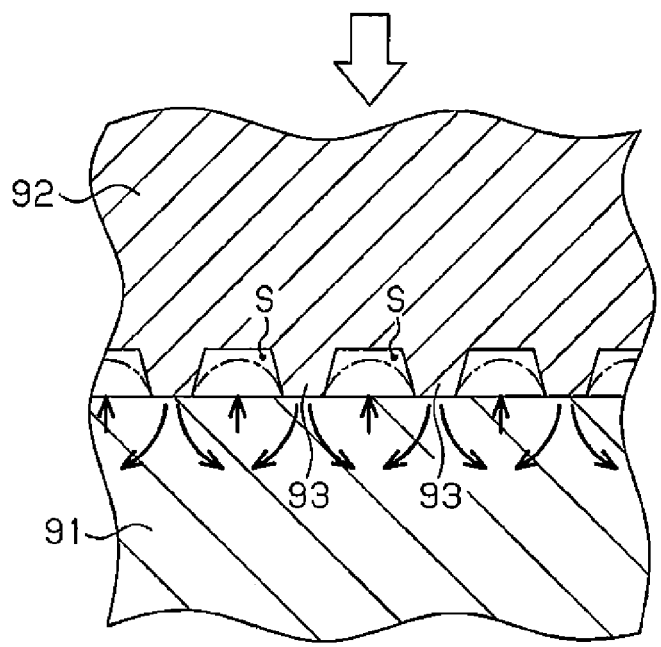
FIG. 9 is a schematic diagram illustrating the flow of the material of the machining target portion when molding the rack teeth.

As illustrated in FIG. 8, on the first and second inner circumferential surfaces 131a and 132a (the inner wall surfaces 141a, 151a, and 161a), concave and convex portions 181, 182, 183, and 184 including a plurality of minute irregularities may be formed by knurling or the like. It is also possible to increase the frictional resistance acting between the material of the blank 11, by the concave and convex portions 181 to 184.

The ridges 143 and 152 may be formed only on the first inner circumferential surface 131a, and the ridges 144 and 162 may not be formed on the second inner circumferential surface 132a. Similarly, the ridges 143 and 152 may not be formed on the first inner circumferential surface 131a, and the ridges 144 and 162 may be formed only on the second inner circumferential surface 132a. Furthermore, the ridge may not be formed on the entire circumference of the first inner circumferential surface 131a. For example, the ridges 143 may be formed only on the inner wall surface 141a of the lower gripping groove 141, or the ridges 152 may be formed only on the inner wall surface 151a of the first upper gripping groove 151. Similarly, the ridges 144 may be formed only on the inner wall surface 141a of the lower gripping groove 141, or the ridges 162 may be formed only on the inner wall surface 161a of the second upper gripping groove 161.

The ridges 143, 144, 152, and 162 may be removed from the first and second inner circumferential surfaces 131a and 132a. That is, by making the axial length L2 of the second inner circumferential surface 132a longer than the axial length L1 of the first inner circumferential surface 131a, the material shortage at both end portions of the machining target portion 14 close to the first and second shaft portions 12 and 13 may be suppressed.

The axial length L1 of the first inner circumferential surface 131a may be substantially equal to the axial length L2 of the second inner circumferential surface 132a.

The irregularities may be provided in the portion facing the teeth 72 at the inner wall surface 141a of the lower gripping groove 141.

The blank 11 in which both axial end portions of the machining target portion 14 are thicker than the center thereof was used, but a blank of a round bar in which the machining target portion 14 is constant over the overall length may be used.

Instead of the rack shaft 1 of a variable gear ratio type, in manufacturing of the rack shaft in which a ratio of the turning angle change of the turning wheel to the steering angle change of the steering wheel is constant regardless of the steering angle, the first or the second embodiment may be applied.

The invention claimed is:

1. A method of manufacturing a rack shaft comprising:
   providing a blank that is equipped with a first shaft portion, a second shaft portion, and a machining target portion, which is located between the first shaft portion and the second shaft portion, wherein a volume per unit length of at least one of a first end portion of the machining target portion, which is close to the first shaft portion, and a second end portion of the machining target portion, which is close to the second shaft portion is greater than a volume per unit length of an intermediate portion in the axial direction of the machining target portion; and
   molding a plurality of rack teeth, which are aligned in an axial direction of the blank, on the machining target portion by forging the machining target portion while gripping the first and second shaft portions,
   wherein the molding forms the rack teeth in both of the first end portion of the machining target portion and the second end portion of the machining target portion.

2. The method of manufacturing the rack shaft according to claim 1, wherein, in the molding of the plurality of rack teeth, the machining target portion is plastically deformed to fill a closed space of substantially the same shape as a tooth portion of the rack shaft formed with the rack teeth.

3. The method of manufacturing the rack shaft according to claim 1, wherein
   the machining target portion is formed at a position closer to a shaft end portion of the first shaft portion than a shaft end portion of the second shaft portion,
   a first large-volume portion is formed at the first end portion of the machining target portion,
   a second large-volume portion is formed at the second end portion of the machining target portion, and
   the second large-volume portion has a larger volume than the first large-volume portion.

4. A method of manufacturing a rack shaft comprising:
   providing a blank that is equipped with a first shaft portion, a second shaft portion, and a machining target portion, which is located between the first shaft portion and the second shaft portion, wherein a volume per unit length of at least one of a first end portion of the machining target portion, which is close to the first shaft portion, and a second end portion of the machining target portion, which is close to the second shaft portion is greater than a volume per unit length of an intermediate portion in the axial direction of the machining target portion; and
   molding a plurality of rack teeth, which are aligned in an axial direction of the blank, on the machining target portion by forging the machining target portion while gripping the first and second shaft portions,
   wherein the machining target portion is formed at a position closer to a shaft end portion of the first shaft portion than a shaft end portion of the second shaft portion,
   a first large-volume portion is formed at the first end portion of the machining target portion,
   a second large-volume portion is formed at the second end portion of the machining target portion, and
   the second large-volume portion has a larger volume than the first large-volume portion.

* * * * *